UNITED STATES PATENT OFFICE.

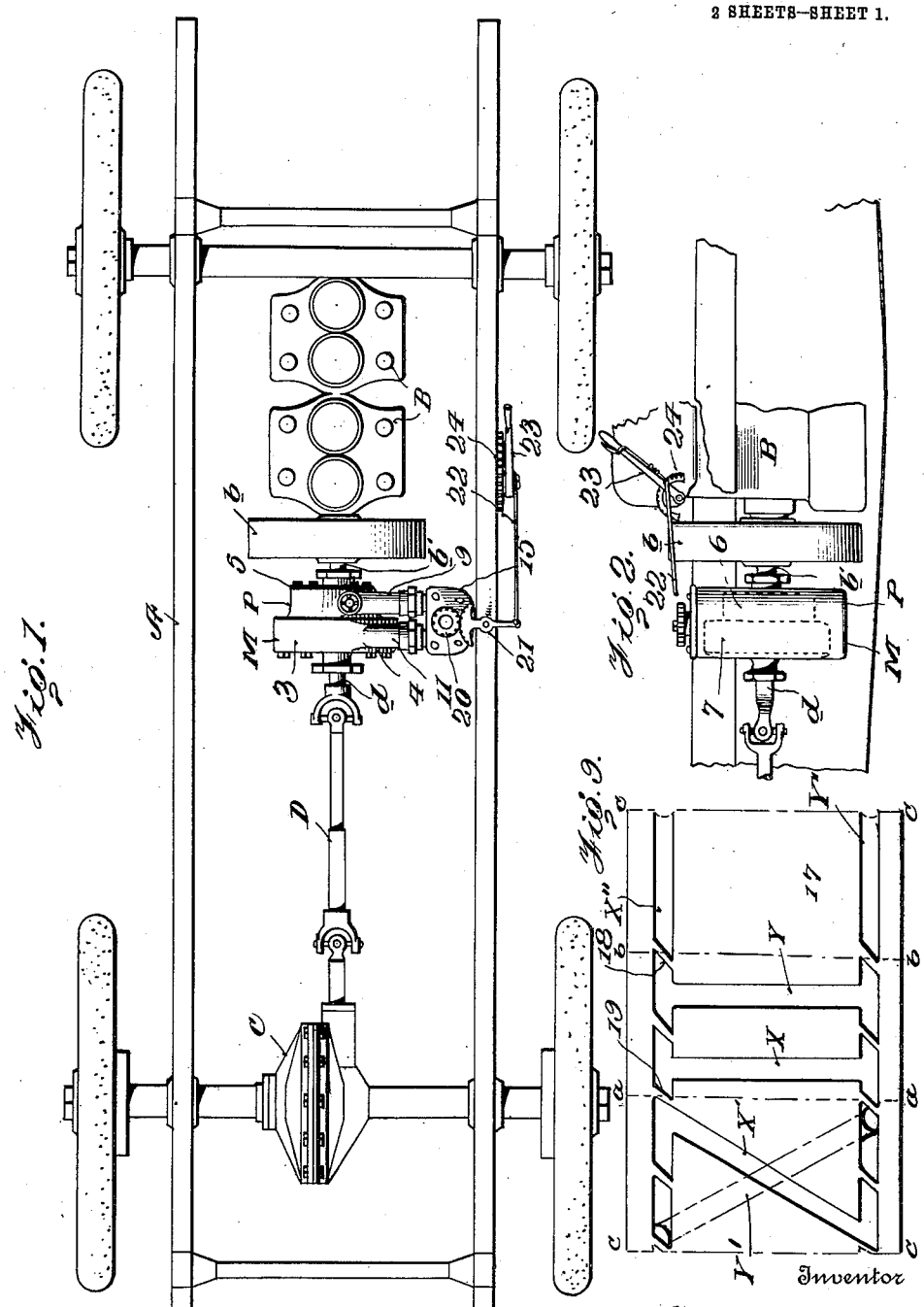

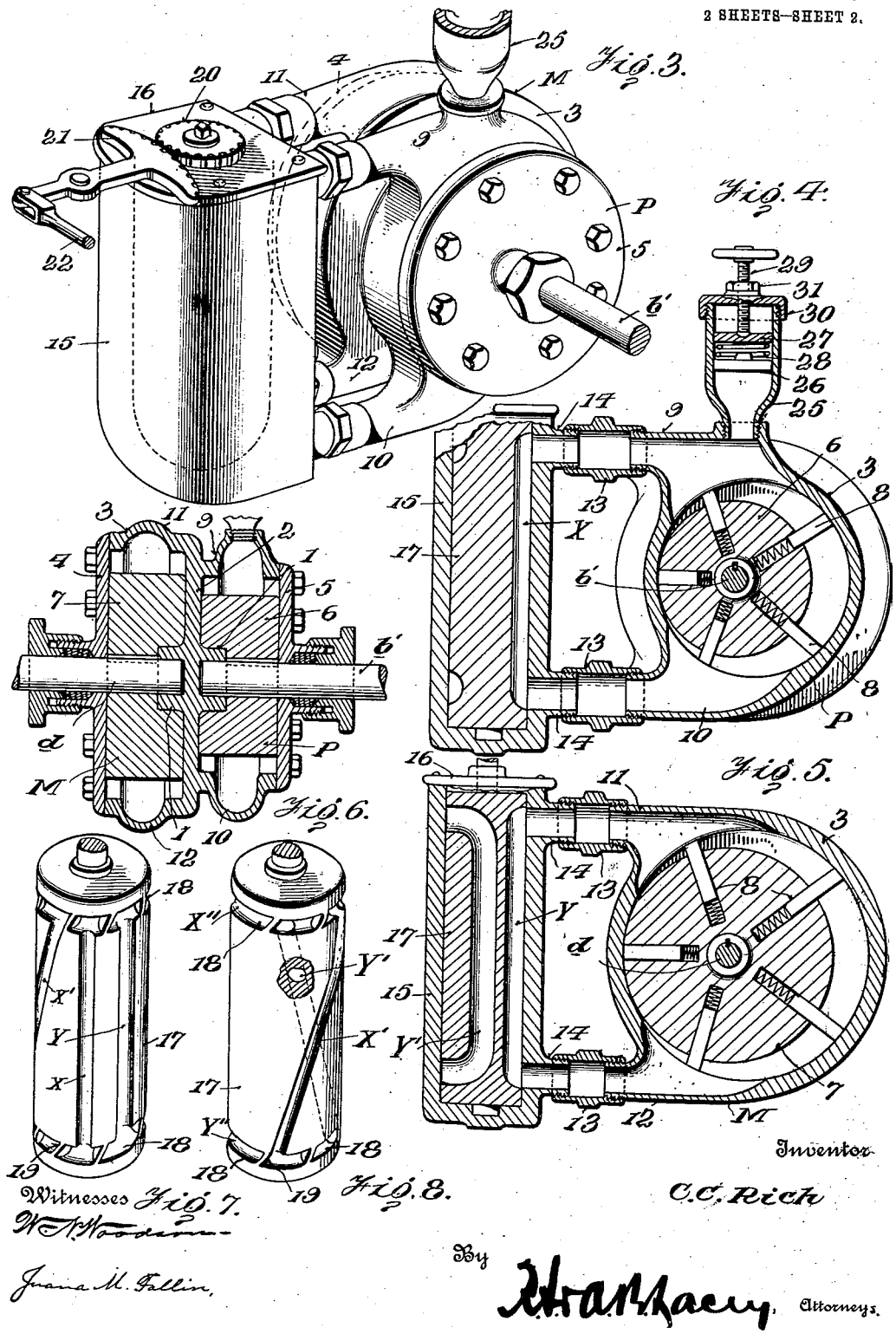
C. C. RICH.
HYDRAULIC TRANSMISSION MECHANISM.
APPLICATION FILED APR. 16, 1910.
991,646.
Patented May 9, 1911.
2 SHEETS—SHEET 2.

CHARLES CLAYTON RICH, OF MOUNT VERNON, NEW YORK, ASSIGNOR TO THE HYDRO-KINETIC TRANSMISSION COMPANY, OF MOUNT VERNON, NEW YORK, A CORPORATION OF MAINE.

HYDRAULIC TRANSMISSION MECHANISM.

991,646.  Specification of Letters Patent.  Patented May 9, 1911.

Application filed April 16, 1910. Serial No. 555,832.

*To all whom it may concern:*

Be it known that I, CHARLES CLAYTON RICH, a citizen of the United States, residing at Mount Vernon, in the county of Westchester and State of New York, have invented certain new and useful Improvements in Hydraulic Transmission Mechanisms, of which the following is a specification.

This invention comprehends certain new and useful improvements in hydraulic transmission mechanism (Case A), the present invention being primarily designed for automobiles.

It is a well recognized fact that it is a desideratum in automobile construction to so arrange and install the parts that they will be easily accessible for the purpose of detachment, overhauling, or for repairs, and with these conditions in view, my invention has for its primary object, a simple, durable and efficient construction of hydraulic transmission mechanism, the parts of which will be few in number, capable of being easily manufactured, and readily assembled, capable of being easily reached, and accessible for repair or replacement, and which will be compact as well as light and durable.

The invention also has for its object a hydraulic power transmission mechanism which will be possessed of the characteristics of simplicity, sensitiveness and capability of easy running to a marked degree, none of the parts being liable to hang, and the varying of speed of which the device is capable in no wise affecting the gasolene or other internal combustion engine which is the prime mover of the device.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings in which:

Figure 1 is a plan view of an automobile chassis illustrating one embodiment of my hydraulic power transmission mechanism; Fig. 2 is a side elevation of a portion of the mechanism, parts being shown in dotted lines; Fig. 3 is an enlarged perspective view of the device; and, Figs. 4 and 5 are transverse sectional views through the pump and fluid pressure motor of the apparatus; Fig. 6 is a diametrical section through the single casing which forms the housing for the two main parts of the apparatus; Figs. 7 and 8 are detail sectional views of a revoluble valve which may be employed; and, Fig. 9 is a developed view of the periphery of said valve.

Corresponding and like parts are referred to in the following description and indicated in all the views of the accompanying drawings by the same reference characters.

Referring to the drawing and now particularly to Fig. 1, A designates an automobile running gear, and B designates a gasolene or other internal combustion engine provided with the ordinary fly-wheel $b$, and drive shaft $b'$. C designates the differential case in which the differential gears and rear axles are mounted, and D designates the transmission shaft which may be of any desired construction including telescopic sections and universal joints, as shown adapted to transmit the power from the driven shaft $d$ to the rear axles, in the customary manner. As best illustrated in Fig. 6, the drive shaft $b'$ and driven shaft $d$ are arranged in longitudinal alinement with each other, although this is not necessary their adjoining ends being slightly spaced from each other and journaled in bearings 1 that are formed as integral parts of a middle web or partition 2 constituting an integral portion of a one-piece casting 3 which with its two detachable heads 4 and 5 constitutes the housing or casing of the hydraulic or other fluid pressure pump P and hydraulic or other fluid pressure motor M.

It is to be understood that the invention is not limited to the use of water as the fluid pressure medium, notwithstanding the use hereinbefore of the term "hydraulic," and that such term is to be taken in its broadest sense, as I prefer oil as a fluid pressure medium in view of the fact that it will not freeze, it will subserve the additional function of a lubricating means, and owing to its greater density will not have the same tendency to leak.

The rotors 6 and 7 that are secured respectively to the shafts $b'$ and $d$ within the two compartments of the casing 3 on opposite sides of the middle partition 2, may be of any desired construction or design. For instance, as illustrated in Figs. 4, and 5, they may be of the eccentrically mounted type with any desired number of radially movable abutments 8 spring-pressed in an outward direction against the walls of the compartments and passing successively the inlet and outlet ports.

In the present embodiment of the invention, the inlet port of the pump P is partly defined by a tubular arm 9, and the outlet port thereof is correspondingly defined by an arm 10 extending parallel to the arm 9, the inlet port of the motor M in one position of the valve 17 is similarly defined by a tubular arm 11, and the outlet port of the motor by a corresponding arm 12, the arms 11 and 12 being also arranged parallel to each other and to the arms 9 and 10. Preferably, all of these arms terminate in the same plane and are screw-threaded or otherwise formed so that they may be detachably connected by unions 13 or otherwise to the nipples 14 that project from one face of the valve casing 15. The casing 15 of the valve may be of any desired construction, being preferably provided at one end with a cover plate 16 by which access may be had to the interior parts, and the casing contains a hydraulic valve 17 which is rotatably mounted therein and which in the present embodiment of the invention has its periphery divided, for action, into three equal parts, such parts being indicated in Fig. 9 of the drawing, by the lines $a$—$a$, $b$—$b$ and $c$—$c$. Each one of these peripheral portions is formed with passages designed according to the particular position to which the valve is turned to register with the inlet and outlet ports of the pump and motor. One of these peripheral portions is provided with parallel passages designated X and Y respectively, said passages being separated from each other and designed to register respectively with the inlet and outlet ports 9 and 10 of the pump P and with the inlet and outlet ports 11 and 12 of the motor M. Manifestly in this position of the parts, as the shaft $b'$ rotates the fluid will be circulated through the pump and will not be driven thereby into the motor M. In this position, the driven shaft $d$ which extends into and which is secured in the rotor 7 may rotate or not according to whether or not the vehicle is at a stand-still or running by its own momentum, in the latter event, of course the shaft $d$ will rotate and the rotor 7 will thereby circulate the fluid through the motor. But no motion whatever will be transmitted from the shaft $b'$ to the shaft $d$. The second of these three peripheral portions of the valve 17 is provided with obliquely extending passages X' and Y', one of these passages being in the nature of a groove, while the other is in the nature of a bore so that the passages may pass each other without intersecting. When the valve is turned so that these passages register with the ports of the pump and motor, it is evident that the passage X' will establish communication between the outlet port 10 of the pump and the inlet port 11 of the motor and the passage Y' will establish communication between the outlet port 12 of the motor and the inlet port 9 of the pump. Hence it will be understood that as the shaft $b'$ is driven, the rotor 6 of the pump will drive the fluid into the inlet port 11 thereby turning the shaft $d$ in the same direction that the shaft $b'$ is turning. The third of these three peripheral portions of the valve 17 is formed with circumferentially extending passages X'' and Y'' designed to overlap the ports 9 and 11 of the pump and motor, and the complemental ports 10 and 12. Hence it will be understood that in this position of the valve, the fluid will be driven by the rotor 6 of the pump out of the outlet port 10 thereof and into the port 12 of the motor, the oil flowing back from the port 11 of the motor into the inlet port 9 of the pump and consequently the shaft $d$ will be turned in a direction opposite to that in which the shaft $b'$ is rotating.

It will be seen, particularly by reference to Figs. 7, 8 and 9, that I have made provision to prevent any choking of the engine, or jar and sticking of the parts in passing from one position of the valve to the other by means of lateral passages 18 which with what may be termed extensions of the passages X'' Y'' form practically uninterrupted grooves around the body of the valve with relatively small webs or partitions 19 which are preferably oblique as shown so that the lateral passages will slightly overlap. By this construction, there is never a time in the operation when the pump or motor will be entirely shut off from the valve and circulation in one direction will be at all times maintained.

It is to be understood that my invention is not limited to any particular means for turning the valve to any one of its three positions. In order, however, to show a completely operative structure, I have illustrated a spur pinion 20 for this purpose secured to the protruding stem of the valve 17, the pinion meshing with a rack segment 21, the outer arm of which is connected by a link rod 22 to a hand lever 23 which may be mounted in convenient proximity to the driver's seat and which is preferably provided with an ordinary detent designed for engagement with a quadrant 24, the quadrant being notched for neutral, advance and reverse positions and for any desired number of intermediate positions, for it will be clear that any gradation of speed may be secured by merely shifting the valve so that the passages thereof in the desired position of the valve will either completely or partially uncover the ports of the pump and motor.

In order to provide compensation for changes in the volume of fluid contained in the motor-pump set, resultant upon changes of temperature, slight leakage that may occur, etc., I mount upon the pump casing a reservoir 25, said reservoir containing a packed compression disk 26, a follower plate 27 above said disk in spaced relation thereto, an expansion spring 28 interposed between the follower-plate and compression disk, and an adjusting screw rod 29 which works through a cap plate 30 and bears in a socket in the upper face of the plate 27 being held in the required position by means of a lock nut 31. By this means, the compression disk 26 may be forced down from time to time as required by any diminution in the volume of oil contained in the motor-pump set, while at the same time, the yielding of the compression disk will provide a cushion to take care of any expansion or any undue increase in the proportionate volume of oil in the pump P.

From the foregoing description in connection with the accompanying drawings, the operation of my improved fluid pressure transmission mechanism will be apparent, as the function of the different parts and the operation of the valve 17 in its different positions have been described in connection with the detail construction and arrangement of the parts.

It will be seen that I have provided a very simple, durable and efficient construction of fluid pressure transmission mechanism in which the fluid intake and discharge openings of the pump and motor are directly connected to the smaller openings of the valve casing, thereby entirely eliminating pipe lines and fittings such as elbows, tees, interposed valves, and the like, and consequently also eliminating the frictional resistance of such pipe lines and accessories. As the passages in the valve afford a cross sectional area at least equal to the cross sectional area of the intake and discharge openings or terminals of the pump and motor, frictional resistance to the flow of fluid is reduced to a minimum.

It will be noted that the entire valve mechanism may be disengaged and is removable and detachable from the pump and motor mechanism without dismounting either the pump or motor or disturbing any of the other parts. Conversely, the pump may be dismounted without in any manner disturbing the valve and motor, and the motor may be removed without disturbing the valve or pump.

In addition to the foregoing advantages, it may be stated that by my invention entire control as regards the direction of the travel of the vehicle either forward or backward, and gradation and control of speed are accomplished through the agency of a single valve and also the motor brought to a full stop without stopping the engine itself actuating and driving the pump. As has been before stated, the valve may be shifted to different positions without interfering with the proper action of the engine, as the webs between the several passages are relatively small and are at all times overlapped by the ports of the motor and pump, there being practically no time when any blank wall in the valve will come opposite any of the ports of the driving or driven elements.

Having thus described the invention, what is claimed as new is:

1. A fluid pressure power transmission mechanism, comprising a motor pump set embodying a motor and a pump, each of which includes a rotor, and an inlet and outlet passage, all of said inlet and outlet passages terminating in the same plane, a valve casing having inlet and outlet openings for the respective inlet and outlet passages for the motor and pump, and all terminating in the same plane, the inlet and outlet passages of the valve casing leading directly into the inlet and outlet passages of the pump and motor, and a single controlling valve mounted in said valve casing and arranged to control the communication between said inlet and outlet passages, as specified.

2. A fluid pressure power transmission mechanism, comprising a motor pump set, embodying a casing divided into compartments for the pump and motor respectively, and provided in communication with said compartments with inlet and discharge openings defined by tubular arms, all of which project from the casing and terminate in the same plane, a valve casing adjustably connected directly to the ends of said arms and a valve mounted in said casing and arranged to control said openings.

3. A fluid power transmission mechanism comprising a motor-pump set embodying a casing divided into compartments for the pump and motor respectively, and provided in communication with said compartments with inlet and discharge openings defined by tubular arms all of which terminate in the same plane, and a valve casing detachably connected directly to the ends of said arms and including a valve arranged to control said openings.

4. A fluid pressure power transmission mechanism, comprising a motor pump set, embodying a casing divided into compartments arranged one directly alongside of the other, rotors in the respective compartments, shafts journaled in the respective compartments in longitudinal alinement with each other and connected to the respective rotors, the casing being provided, in communication with each of its compartments, with laterally opening inlet and discharge passages, a valve casing having inlet and outlet ports communicating with the respective inlet and outlet openings of the respective compartments, and a single valve mounted in said valve casing at one side of the first-named casing and arranged to control communication between the inlet and discharge passages of the compartments.

5. A fluid pressure power transmission mechanism, comprising a motor pump set, embodying a casing divided into compartments arranged one directly alongside of the other, rotors in the respective compartments, shafts journaled in the respective compartments in longitudinal alinement with each other and connected to the respective rotors, the casing being provided with inlet and discharge passages communicating with the respective compartments and defined by tubular arms, all of which terminate in the same plane, and a valve casing directly connected to said arms at one side of the first named casing, and including a valve controlling said inlet and discharge passages, the latter opening into the valve casing in directions at right angles to the direction of the shafts.

6. A fluid pressure power transmission mechanism, comprising a combined pump and motor, both the motor and the pump being provided with fluid intake and discharge openings set in spaced relation to each other, a valve casing connected to the pump and motor, and a revoluble valve mounted in said casing, said valve being cylindric and having its periphery divided into a plurality of parts, one of said parts embodying transversely extending parallel passages adapted to establish communication between the intake and discharge openings of the pump and a separate communication between the intake and discharge openings of the motor, another of the peripheral parts being formed with passages arranged to establish communication between the diagonally opposite fluid openings of the pump and motor, and another part of the periphery being formed with circumferentially extending passages arranged to establish communication between adjoining opening of the pump and motor.

7. A fluid pressure power transmission mechanism comprising a combined pump and motor, both the motor and pump being provided with fluid intake and discharge openings set in spaced relation to each other, a valve casing connected to the pump and motor, and a revoluble valve mounted in said casing, said valve being cylindrical and having its periphery divided into a plurality of parts, one of said parts embodying transversely extending parallel passages adapted to establish communication between the intake and discharge openings of the pump and a separate communication between the intake and discharge openings of the motor another of the peripheral parts being formed with passages arranged to establish communication between the diagonally opposite fluid openings of the pump and motor, and another part of the periphery being formed with circumferentially extending passages arranged to establish communication between the adjoining openings of the pump and motor, all of said passages being formed at their ends with lateral extensions for the purpose specified.

In testimony whereof, I affix my signature in presence of two witnesses.

CHARLES CLAYTON RICH. [L. S.]

Witnesses:
W. N. WOODSON,
FREDERICK S. STITT.